(12) United States Patent
Russell (10) Patent No.: US 7,600,503 B2
(45) Date of Patent: Oct. 13, 2009

(54) FLEX-FUEL VARIABLE DISPLACEMENT ENGINE CONTROL SYSTEM AND METHOD

(75) Inventor: John D. Russell, Portland, OR (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 11/840,154

(22) Filed: Aug. 16, 2007

(65) Prior Publication Data

US 2008/0115759 A1 May 22, 2008

Related U.S. Application Data

(62) Division of application No. 11/602,915, filed on Nov. 20, 2006, now Pat. No. 7,549,408.

(51) Int. Cl.
*F02D 17/02* (2006.01)
(52) U.S. Cl. .................. 123/481; 123/431; 123/198 A; 123/198 F
(58) Field of Classification Search ................. 123/1 A, 123/431, 325, 332, 406.21, 406.23, 406.24, 123/406.25, 406.29, 406.3, 406.31, 406.45–406.47, 123/436, 481, 492, 493, 198 F, 198 DB
See application file for complete search history.

(56) References Cited

U.S. PATENT DOCUMENTS

| 5,018,483 | A | 5/1991 | Kashima et al. | |
|---|---|---|---|---|
| 6,332,448 | B1 | 12/2001 | Ilyama et al. | |
| 6,827,062 | B2 | 12/2004 | Fukusako et al. | |
| 6,951,202 | B2 | 10/2005 | Oda | |
| 7,406,947 | B2 * | 8/2008 | Lewis et al. | 123/478 |
| 7,426,908 | B2 * | 9/2008 | Brehob | 123/25 C |
| 7,549,408 | B2 * | 6/2009 | Russell | 123/481 |
| 2008/0120008 | A1 * | 5/2008 | Russell | 701/102 |
| 2008/0283023 | A1 * | 11/2008 | Lewis et al. | 123/344 |

FOREIGN PATENT DOCUMENTS

JP 2008-128241 * 6/2008

* cited by examiner

*Primary Examiner*—Hai H Huynh
(74) *Attorney, Agent, or Firm*—Allan J. Lippa; Alleman Hall McCoy Russell & Tuttle LLP (57) ABSTRACT

A method for operating an engine having at least one cylinder that may be deactivated and a fuel system operating with an alcohol fuel blend, comprising of adjusting a range of operating parameters in which the at least one cylinder is deactivated, where said range is adjusted as the alcohol blend of the fuel varies.

12 Claims, 10 Drawing Sheets

FLEX-FUEL VARIABLE DISPLACEMENT ENGINE CONTROL SYSTEM AND METHOD

The present application is a divisional of U.S. Ser. No. 11/602,915, titled "Flex-Fuel Variable Displacement Engine Control System and Method", filed Nov. 20, 2006, the entire contents of which are incorporated herein by reference.

BACKGROUND AND SUMMARY

Engines operating with a variable number of active or deactivated cylinders may be used to increase fuel economy, while optionally maintaining the overall exhaust mixture air-fuel ratio about stoichiometry via cylinder valve deactivation. In some examples, half of an engine's cylinders may be deactivated during selected conditions, where the selected conditions can be defined by parameters such as speed/load window, as well as various other operating conditions including vehicle speed.

However, in some engine/vehicle combinations, only modest fuel economy gains may be possible. Various factors may limit the potential fuel economy gain, such as transition constraints, noise vibration harshness constraints, and others. Further, these factors can serve to reduce the available window of VDE operation, thus further reducing potential gains. While various approaches of the skilled engine designer are aimed at improving these limitations via improved design and system optimization, fuel economy gains may nevertheless be difficult to realize in practice.

The inventor herein has recognized a significant potential constraint on the available operating window may be related to knock. For example, when trying to expand VDE operation in some systems, the engine may become knock limited during various conditions, such as higher load operation. As such, when VDE operation is utilized, the engine cylinders that continue combustion may be forced into a speed/load region (e.g., higher load) different than otherwise experienced at full cylinder conditions and thus may increase a tendency toward knock. As a result, ignition timing retard, used to mitigate knock, can generate a fuel economy loss that possibly outweighs the gains of VDE operation.

Again, while various approaches may be used to optimize engine design in an attempt to mitigate engine knock, for example, such optimizations typically involve still other trade-offs.

The above issues and trade-offs may be addressed by a flex-fuel (e.g., alcohol, ethanol, E-85, gasoline) variable cylinder combustion engine. For example, the system may adjust VDE operation, such as the VDE operating window, to take advantage of the knock abatement properties of an alcohol-blended fuel when present in the vehicle. In this way, not only can the vehicle operate on a variety of fuel blends, but the partial cylinder deactivation of the engine can be coordinated with the presence and blend of the fuel, thereby providing improved performance when possible. Further, the engine may include direct injection or port injection with at least some open valve injection to further exploit charge cooling characteristics of the blend and further abate knock thus enabling expanded VDE operation.

In another example, the engine control system may adjust the fuel blend during operating conditions to provide knock abatement when needed to exploit the synergistic effect of the fuel blend and partial cylinder deactivation. For example, a directly injected fuel blend with a variable blend of gasoline and alcohol may be used to enable extended VDE operating conditions (e.g., at higher engine loads) by advantageously utilizing variable charge cooling matched to the current engine conditions.

In this way, it may be possible to realize greater fuel economy gains from partial cylinder operation, while also enabling further benefits of alternative fuels.

DETAILED DESCRIPTION

Figure 1:
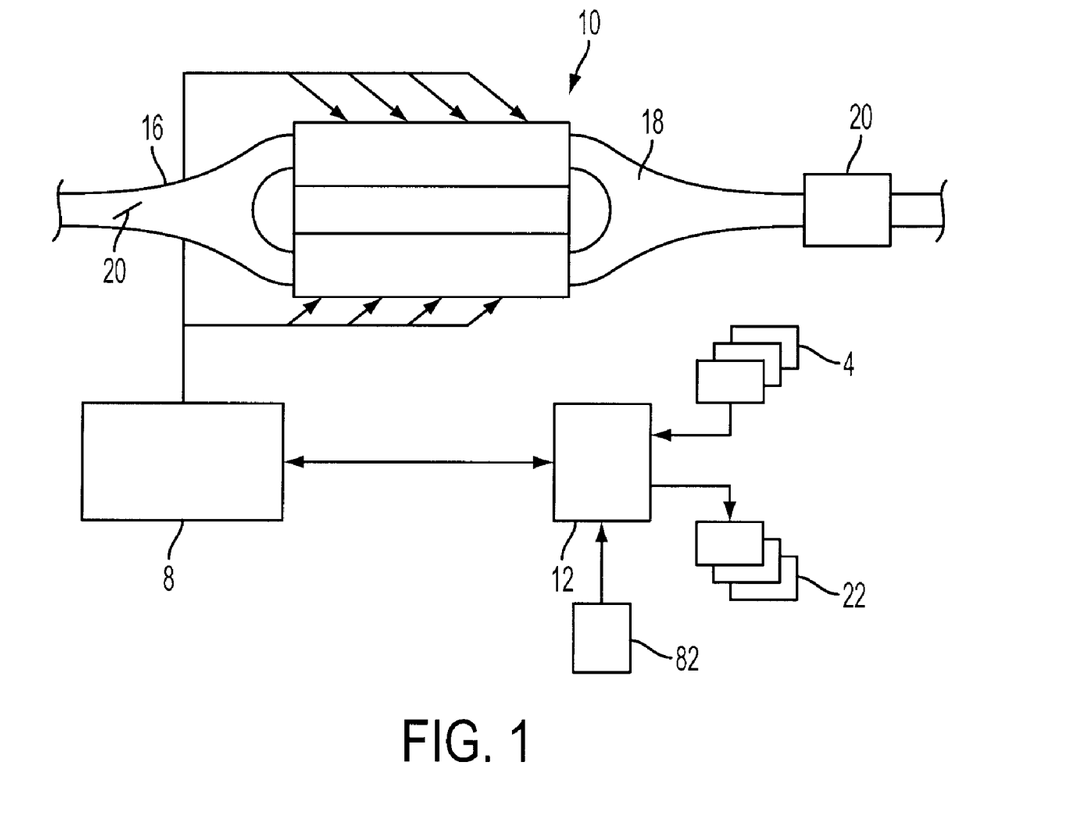
FIG. 1 shows an example engine and exhaust system layout.

FIG. 1 shows an example variable displacement engine (VDE) 10, in which four cylinders (e.g., two in each bank) may have cylinder valves held closed during one or more engine cycles. The cylinder valves may be deactivated via hydraulically actuated lifters coupled to valve pushrods, or via a cam profile switching mechanism in which a cam lobe with no lift is used for deactivated valves. Still other valve deactivation mechanisms may also be used, such as electrically actuated valves.

Engine 10 may operate on a plurality of substances, which may be delivered via fuel system 8. Fuel system 8 may include various tanks, alcohol separator units, control and/or mixing valves, and injectors as described in more detail herein. Specifically, the various substances in fuel system 8 may include multiple different fuel blends, injection locations, or various other alternatives. In one example, multiple different substances having different gasoline and/or alcohol and/or water concentrations may be delivered to the engine, and may be delivered in a mixed state, or separately delivered. Further, the relative amounts and/or ratios of the different substances may be variably controlled by a controller 12 in response to operating conditions during engine operation, where the various operating conditions may be provided via sensor(s) 4, or internally determined in controller 12, or combinations thereof.

In one example, the different substances may represent different fuels having different levels of alcohol, including one substance being gasoline and the other being ethanol. In another example, engine 10 may use gasoline as a first substance and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gasoline), a mixture of an alcohol and water, a mixture of an alcohol, water, and gasoline, etc as a second substance. In still another example, the first substance may be a gasoline alcohol blend with a lower alcohol concentration than a gasoline alcohol blend of a second substance.

In another example, different injector locations may be used for different substances. For example, a single injector (such as a direct injector) may be used to inject a mixture of two substances (e.g., gasoline and an alcohol/water mixture), where the relative amount or ratio of the two substances in the mixture may be varied during engine operation via adjustments made by controller 12 via a mixing valve (not shown), for example. In still another example, at least two different injectors for one or more cylinders may be used, such as port and direct injectors, each injecting a different substance in different relative amounts as operating conditions vary. In even another example, different sized injectors, in addition to different locations and different substances, may be used. In yet another example, two port injectors with different spray patterns and/or aim points may be used with different injection timing to deliver different mixture of at least two substances to the cylinder.

Controller 12 may be a microcomputer, including microprocessor unit, input/output ports, an electronic storage medium for executable programs and calibration values, random access memory 108, keep alive memory 110, and a data bus. Controller 12 is shown receiving various signals from sensors 4 coupled to engine 10, and sending control signals to various actuators 22 coupled to the engine and/or vehicle. In addition to those signals discussed below, controller 12 may receive a measurement of inducted mass air flow (MAF) from mass air flow sensor coupled to the intake system; a throttle position TP from a throttle position sensor coupled to throttle 20, and an indication of knock from knock sensor 82.

FIG. 1 shows engine 10 as being a v-8 engine with two cylinder banks having an intake manifold 16 (with throttle 20) and an exhaust manifold 18 coupled to an emission control system 20, which may include one or more catalysts and air-fuel ratio sensors. For example, the exhaust system may include light-off catalysts and underbody catalysts, as well as exhaust manifold, upstream and/or downstream air-fuel ratio sensors. While FIG. 1 shows a specific engine configuration, various other configurations may by used, if desired.

As will be described in more detail below, various advantageous results may be obtained by operation of a variable displacement engine utilizing injection of a fuel having alcohol. For example, when using both gasoline and a fuel having alcohol (e.g., ethanol), it may be possible to adjust the relative amounts of the fuels to take advantage of the increased charge cooling of alcohol fuels (e.g., via direct injection) to reduce the tendency of knock (e.g., in response to knock or increased load, increasing a relative amount of alcohol and/or water) and thereby extend a reduced displacement operating mode. Thus, it may be possible to operate with a reduced displacement over a greater speed/load operating range, for example, by mitigating engine knock limitations. This can increase fuel economy gains of variable displacement, while also allowing increased engine performance in a full cylinder mode.

Figure 2A:
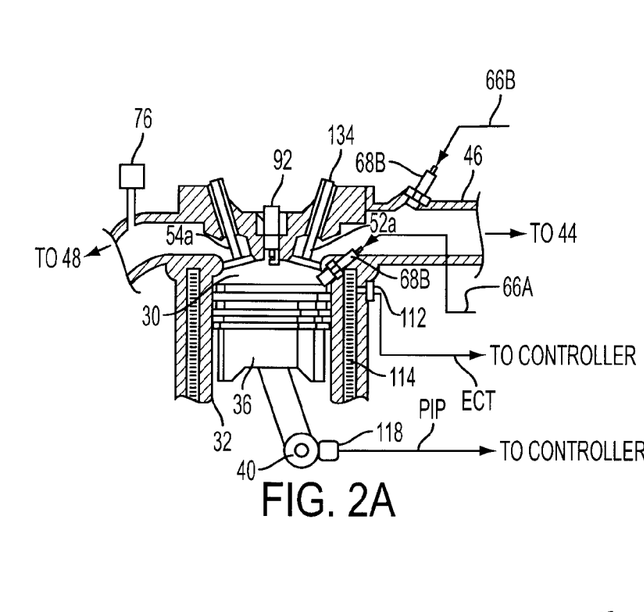
FIGS. 2A-B and 3 show a partial engine view.

Referring now to FIG. 2A, it shows one cylinder of a multi-cylinder engine, as well as the intake and exhaust path/ports connected to that cylinder. Further, FIG. 2A shows one example fuel injection configuration with two fuel injectors per cylinder, for at least one cylinder. In one embodiment, each cylinder of the engine may have two fuel injectors. The two injectors may be configured in various locations, such as two port injectors, one port injector and one direct injector (as shown in FIG. 2A), or others.

Continuing with FIG. 2A, it shows a multiple injection system, where engine 10 has both direct and port fuel injection, as well as spark ignition. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used.

In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal 68A received from controller 12 via an electronic driver. While FIG. 2A shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel and/or water may be delivered to fuel injector 66A by a high pressure fuel system (not shown) including a fuel tank, fuel pumps, and a fuel rail. Alternatively, fuel and/or water may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake port 46, rather than directly to cylinder 30. Fuel injector 66B delivers injected fuel in proportion to the pulse width of signal 68B received from controller 12 via an electronic driver. Note that a single driver may be used for both fuel injection systems, or multiple drivers may be used. The fuel system may also deliver vapors to intake manifold 44, in addition to supplying fuel to injectors 66A and 66B (although not shown in this Figure). Various fuel systems and fuel vapor purge systems may be used, as noted herein.

As shown in FIG. 1, the intake system may include an electronically actuated throttle plate. Exhaust gas sensor 76 is shown coupled to exhaust manifold 48 upstream of a catalytic converter. Sensor 76 may be any of many sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation.

FIG. 2A further shows temperature sensor 112 coupled to cooling sleeve 114 for providing a measure of engine coolant temperature (ECT) to controller 12, as well as a Hall effect sensor 118 coupled to crankshaft 40 for providing a profile ignition pickup signal (PIP).

Controller 12 may cause combustion chamber 30 to operate in a variety of combustion modes, including a homogeneous air/fuel mode. A homogenous mixture may be formed by operating one or both of injectors 66A and 66B before an intake stroke (which may be closed valve injection) or during an intake stroke, for example. In still other examples, multiple injections from one or both of injectors 66A and 66B may be used during one or more strokes (e.g., intake, compression, exhaust, etc.). Even further examples may be where different injection timings and mixture formations are used under different conditions.

Figure 2B:
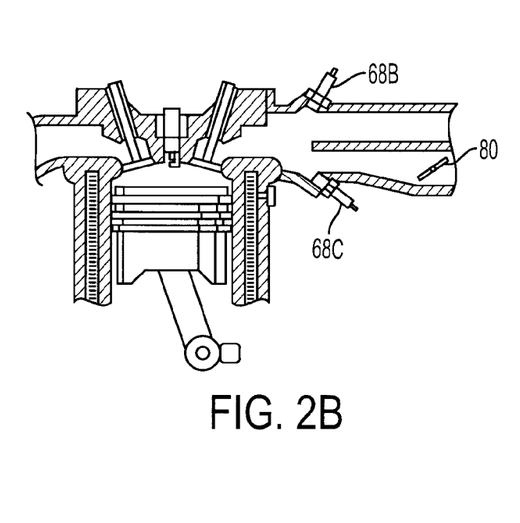

While FIG. 2A shows two injectors for the cylinder, one being a direct injector and the other being a port injector, in an alternative embodiment two port injectors for the cylinder may be used, along with open valve injection, for example, as described with regard to FIG. 2B.

While not shown in FIG. 2A, a variable valve timing system, such as a variable camshaft timing system, may be used. As described above, FIG. 2A merely shows one cylinder of a multi-cylinder engine, and it is understood that each cylinder has its own set of intake/exhaust valves, fuel injectors, spark plugs, etc. While not shown in FIGS. 1-2, engine 10 may be coupled to various boosting devices, such as a supercharger or turbocharger.

Referring now to FIG. 2B, it shows two port injectors (68B and 68C) coupled to two cylinders 30 via two separated ports, although in an alternative approach they may be coupled to a common port. Further, while the two ports are shown leading to a common valve, the ports may be separated and lead to separate valves (e.g., each port leading exclusively to a single intake valve). For example, one injector may be used to deliver fuel with a higher alcohol content (e.g., percentage or ratio) than the other injector, where the higher alcohol content injector is adjusted to provide more open valve injection (to increase the charge cooling effect). FIG. 2B also shows a charge motion control valve 80 which may be used to adjust the flow within and among the two ports. While FIG. 2B shows the valve upstream of the injector, it may also be located downstream of the injector.

Figure 3:
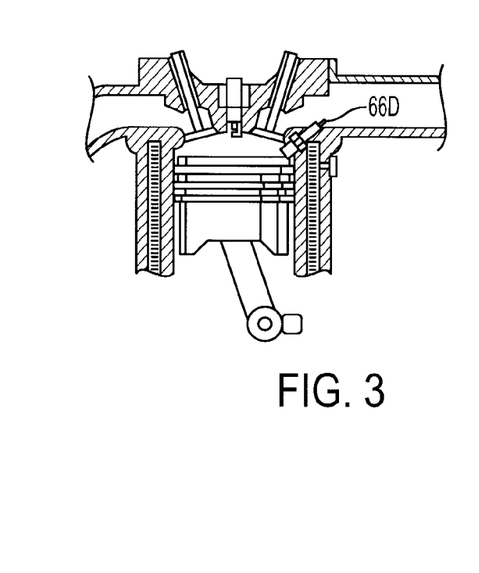

Referring now to FIG. 3, it shows an example engine cylinder similar to that of FIG. 2A, except a single direct injector 66D is shown. The injector may be coupled to a fuel tank having an alcohol fuel blend that may be adjusted, or that is fixed.

Referring now to FIGS. 4A-4D, various fuel systems are described. Specifically, FIG. 4 shows example fuel injector and pump configurations for single and dual injector systems.

Figure 4A:
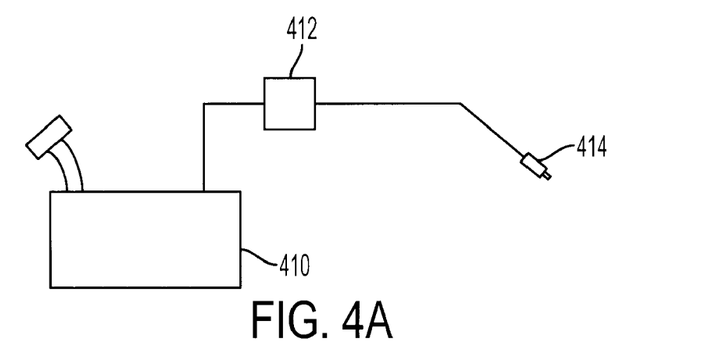
FIGS. 4A-D show example fuel injector and pump configurations.

Referring now specifically to FIG. 4A, an example fuel pump configuration is shown where a single fuel pump 412 and tank 410 is provided for holding a mixture of a first and second substance (e.g., E85, a mixture of at least gasoline and ethanol). Tank 410 may be coupled to an injector 414, which may be a direct injector coupled to a cylinder such as injector 66D. While FIG. 4A shows only a single injector, tank 410 may be coupled to a plurality of cylinders via a fuel rail (not shown).

Figure 4B:
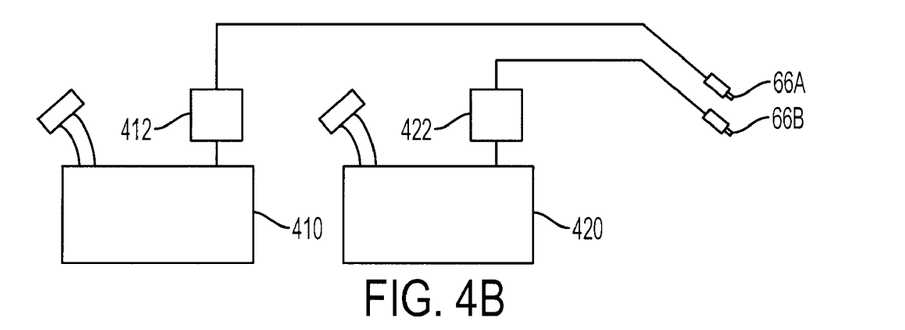

Referring now specifically to FIG. 4B, an example fuel pump configuration is shown where a separate fuel pump and tank is provided for a first and second substance (e.g., a first tank for gasoline and a second tanks for ethanol). Specifically, a first tank 410 is shown for holding a first substance, with pump 412 leading to injector 66A via the fuel line. Likewise, a second tank 420 is shown for holding a second substance, with pump 422 leading to injector 66B via fuel rail 724. While the pumps are shown outside the tank, in an alternative example one or both of the pumps may be located within the tank. Further, a second, high pressure fuel pump may be added to one or both the fuel lines.

One or both the fuel systems may be returnless-type fuel systems, return-type fuel systems, or combinations thereof. Further, the fuel systems may have different characteristics, such as different size tanks, different size pump, different pump capacity, different pump pressure, different pump maximum flows, different on/off cycles (e.g., pump 412 may run more intermittently than pump 422), etc. Note that in some examples only one pump may operate under some conditions. For example, if fuel from tank 410 is not needed, or not enabled (e.g., during cold start conditions), pump 412 may be deactivated (or not activated) while pump 422 operates. In this way, less battery power may be used and less fuel vapor may be generated.

In one example, the first tank may contain an alcohol blend, such as ethanol or an ethanol-gasoline mixture, while the second tank may contain gasoline. However, other fuel substances may also be used.

Figure 4C:
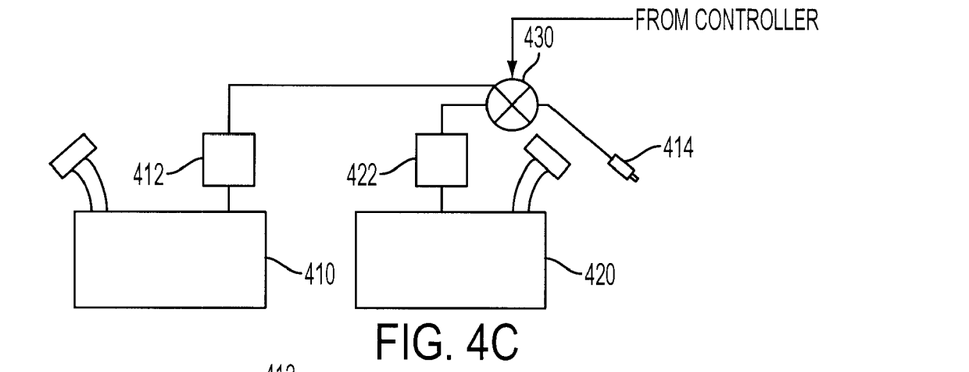

FIG. 4C shows still another example, where substances from tanks 410 and 420 are variably mixed via a mixing valve 430, receiving a signal from controller 12, before being fed to injector 414. Thus, each fuel tank leads to mixing valve 430 that may be adjusted via controller 12 to vary a relative amount of each of the fuel substances, from only the first substance of tank 410 to only the second substance of tank 420, and any relative amount in between. As noted above, the mixing/control valve may lead to a fuel rail having one or more fuel injectors coupled thereto for a plurality of cylinders. In this way, a relative amount of fuel types may be delivered to the engine without requiring two fuel injectors per cylinder.

Figure 4D:
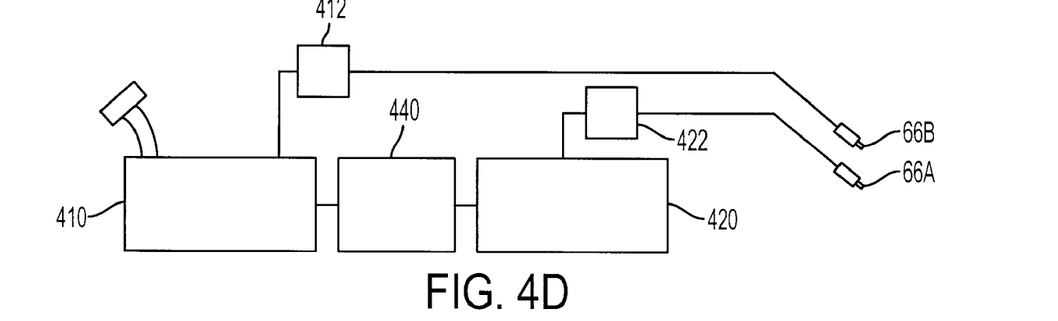

Referring now specifically to FIG. 4D, an example fuel pump configuration is shown where a separate fuel pump and tank is provided for a first and second substance (e.g., a first tank for gasoline and a second tanks for ethanol), along with a separator system 440 for separating components of fuel stored in the first tank for storage in the second tank. For example, a gasoline/ethanol blend stored in tank 410 may have alcohol components (e.g., the ethanol, or a portion thereof) extracted via separator device 440 for storage in tank 420. In this way, a higher alcohol content fuel may be delivered via direct injection for increased charge cooling, without requiring an operator to fill two fuel tanks with different substances.

Various separator approaches may be used, such as electrically driven, water-addition based, etc.

Figure 5:
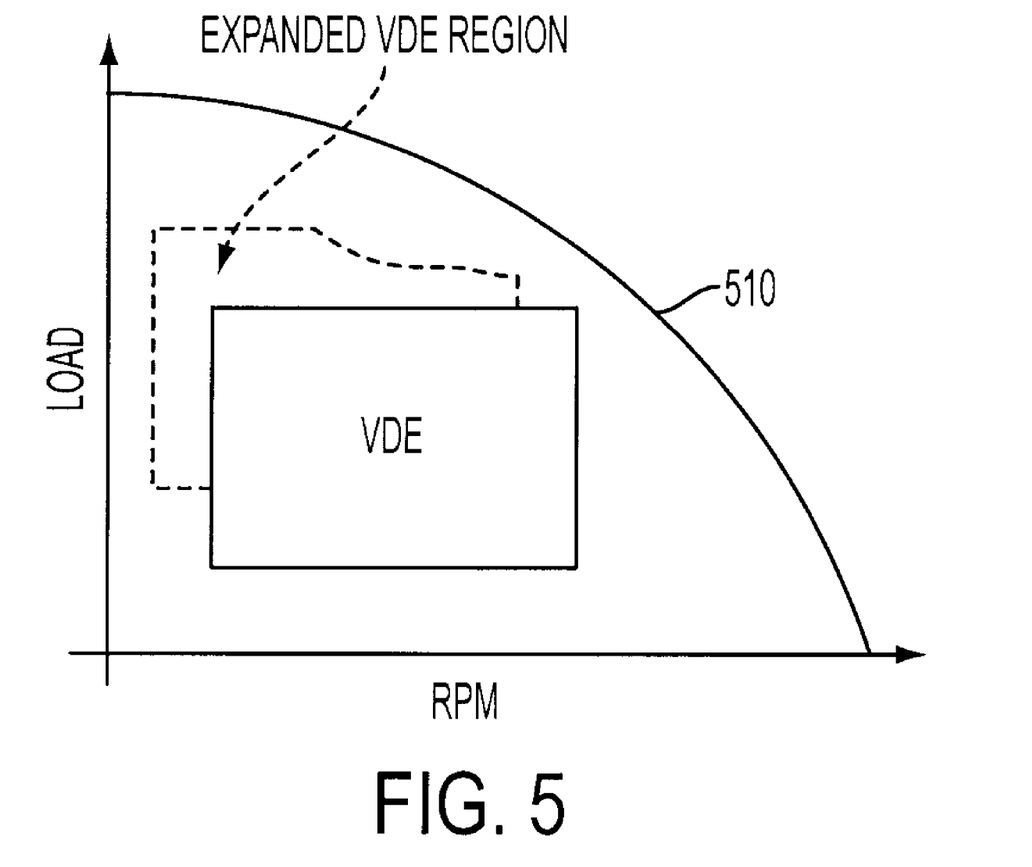
FIG. 5 shows a mode map for an example engine control strategy.

Referring now to FIG. 5, an example graph illustrates a mode map for an example engine control strategy. The map of FIG. 5 shows engine load (which may be an air charge and/or airflow) on the vertical axis and engine speed on the horizontal axis. While this example illustrates speed and load as example parameters, various other may be used in place of, or in addition to, these parameters, including: engine torque, engine coolant temperature, vehicle speed, transmission speed, etc. Also, while this example illustrates 2 modes (a VDE and a full cylinder mode), additional engine modes may also be used. Further, while this example, illustrates VDE and non-VDE (full cylinder) operation, various levels of cylinder deactivation may be used, such as a combination of 2, 4, 6, and 8 cylinder operating modes.

The full cylinder mode operating region is shown bound by the vertical axis on the left hand side, the horizontal axis on the bottom, and the engine operating envelope 510 therebetween. In this manner, full cylinder mode may be used during substantially all operating conditions within the engine operating envelope. However, it may be desirable to utilize partial cylinder operating modes when improved efficiency and/or reduced emissions may be achieved. As such, a partial cylinder operating (e.g., VDE) region represented in this example generally by a rectangular window is shown within the full cylinder mode operating region. During some operating conditions, such as when the engine load and speed are within the partial cylinder operating region, engine 10 may operate in partial cylinder operating mode to achieve improved fuel economy and/or reduced emissions. During other operating conditions, outside of the partial cylinder operating mode operating region, the engine may be operated in full cylinder mode.

In this manner, an engine such as engine 10 described herein may be configured to operate with a reduced number of operating cylinders during some conditions and more operating cylinders during other conditions. As the operating conditions of the engine vary with engine operation, the engine may be controlled by the control system (e.g. controller 12) to transition between various modes of operation. Further, these transitions may be performed by adjusting one or more operating conditions such as spark timing, intake and/or exhaust valve timing and/or lift, turbocharging, fuel injection timing and/or quantity, air/fuel ratio, intake air throttling, EGR addition, exhaust throttling, etc.

Further, the region indicated by the broken line and labeled as the expanded VDE region includes operating conditions where partial cylinder mode may be restricted due to engine knock under some conditions, such as during low ambient humidity. As described herein, by appropriate selection of the reduced cylinder operating window as a function of alcohol charge cooling, for example, an expanded window may be provided when increased charge cooling is possible, and a reduce window may be provided when decreased charge cooling is present. Furthermore, an expanded reduced cylinder operation may be achieved by controlling a relative amount of different fuel substances, such as varying relative amounts of gasoline and ethanol, during engine operation. For example, when ambient humidity is low and/or when a tendency toward engine knock is increased, rather than avoiding or reducing partial cylinder operation, the amount of alcohol delivered to the engine may be adjusted (e.g., increased) to abate knock or the tendency of knock.

Figure 6:
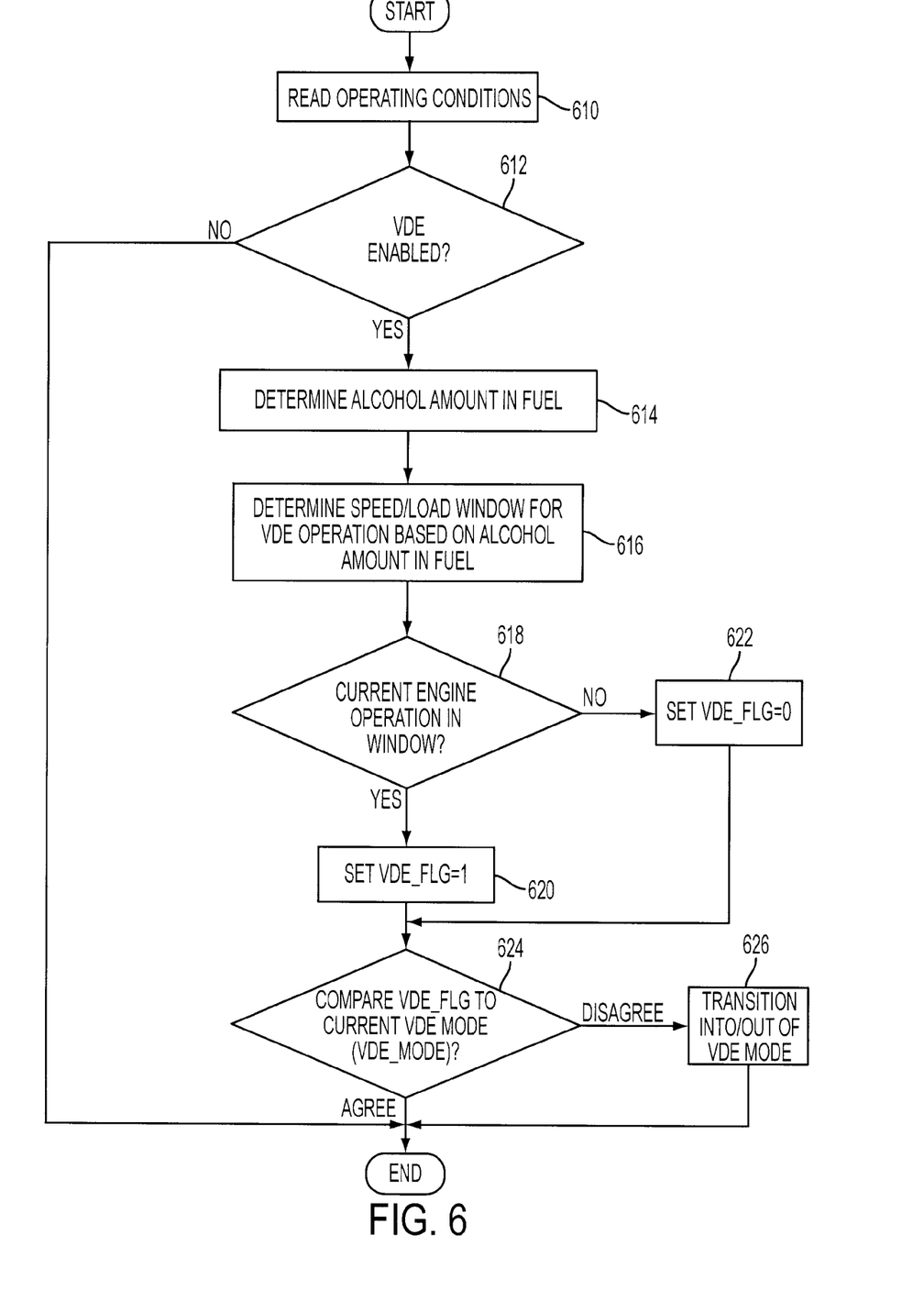
FIGS. 6-11 show example high level control system flowcharts.

Referring now to FIG. 6, a routine is described for controlling selection of VDE operation in response to a fuel alcohol content. First, in 610, the routine reads various operating condition. The operating conditions can include engine operating conditions, vehicle operating conditions, environmental conditions, and various others. Next in 612, the routine determines whether VDE operation is enabled. The determination of 612 can be based on various operating conditions, such as those read in 610 including: the time since the engine is started, engine coolant temperature being greater than a minimum threshold, vehicle speed being greater than a minimum vehicle speed, engine speed being greater than a minimum engine speed, the absence of degraded components and/or sensors, and others. If so, the routine continues to 614 to determine an alcohol amount in the fuel. Various approached may be used to determine fuel alcohol content, including a fuel alcohol sensor for sensing the quality of the fuel, an estimate of fuel alcohol content based on fuel injection amount, air flow, and exhaust gas oxygen sensor feedback, or combinations thereof. Further, various fuel alcohol measures may be used including a weight percentage, a mass percentage, an oxygen percentage, a relevant mass amount, a relevant volume amount, or various others.

Next, in 616, the routine determines a VDE operating window based on various parameters including the fuel alcohol content determined in 614. For example, as described with regard to FIG. 5, the routine may adjust the speed and/or load operating windows in which VDE operation is enabled or selected based on the fuel alcohol content, in addition to other parameters. Again, while in this example the window is generally defined by a speed load window, various other additional or alternative parameters may be used, if desired, such as engine torque, for example.

Next, in 618, the routine determines whether the current engine operation is within the determined window from 616. If so, the routine continues to 620 to set a VDE flag (VDE_flg) to 1. Otherwise, in 622, the routine sets the VDE flag to 0.

From either 620 or 622, the routine continues to 624 to compare the VDE flag to the current VDE mode (VDE_mode). In this example, the current VDE mode represents the current state of engine operation. When the flag and the mode agree, the routine ends. Otherwise, when the flag and the mode disagree, the routine continues to 626 to transition into or out of the VDE mode so that the mode parameter matches the flag set in either 620 or 622.

In this way, it is possible to adjust the engine operating conditions under which VD operation occurs to take advantage of alcohol present in the fuel. Further, it is possible to provide improved engine operation by coordinating the range of VDE operation with the amount of alcohol in the fuel.

Figure 7:
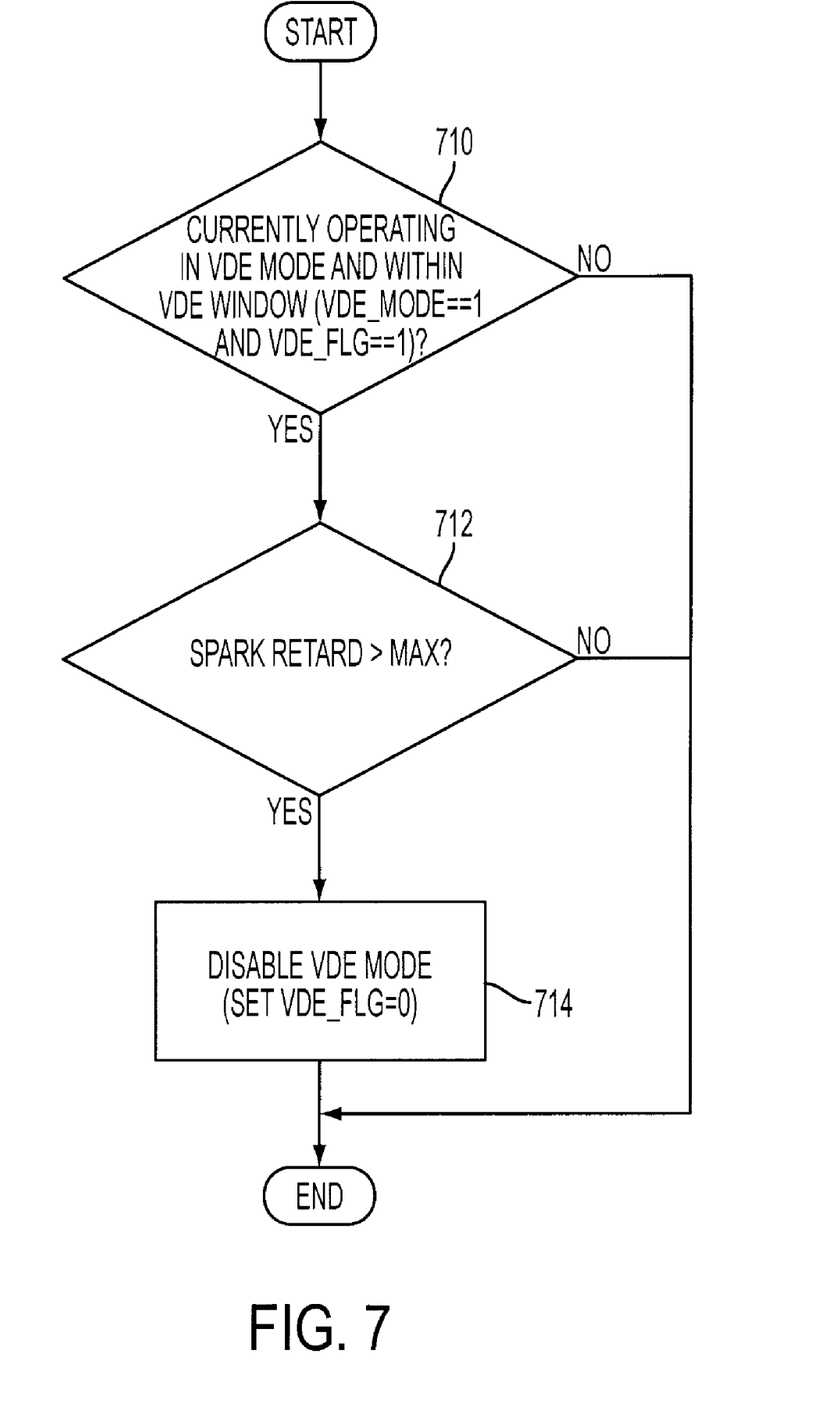

Referring now to FIG. 7, a routine is described for monitoring ignition spark retard during VDE operation to determine whether to disable the VDE operation. First, in 710, the routine determines whether the engine is currently operating in the VDE mode and within the set VDE window by comparing whether the VDE mode parameter (VDE_mod) is equal to 1 and whether the VDE flag (VDE_flg) is equal to 1. If so, the routine continues to 712 to determine whether the ignition timing spark retard is greater than a maximum threshold. The maximum spark retard threshold may be adjusted based on operating conditions, including ambient humidity, engine coolant temperature, and various others. Alternatively, a fixed maximum spark retard may be used. If the answer to 712 is yes, the routine continues to 714 to disable the VDE mode by setting the VDE flag equal to 0. In this way, it is possible to disable VDE operation and transition out of VDE operation into full cylinder operation when the amount of spark retard is such that it offsets any potential fuel economy gains of the VDE mode.

Figure 8:
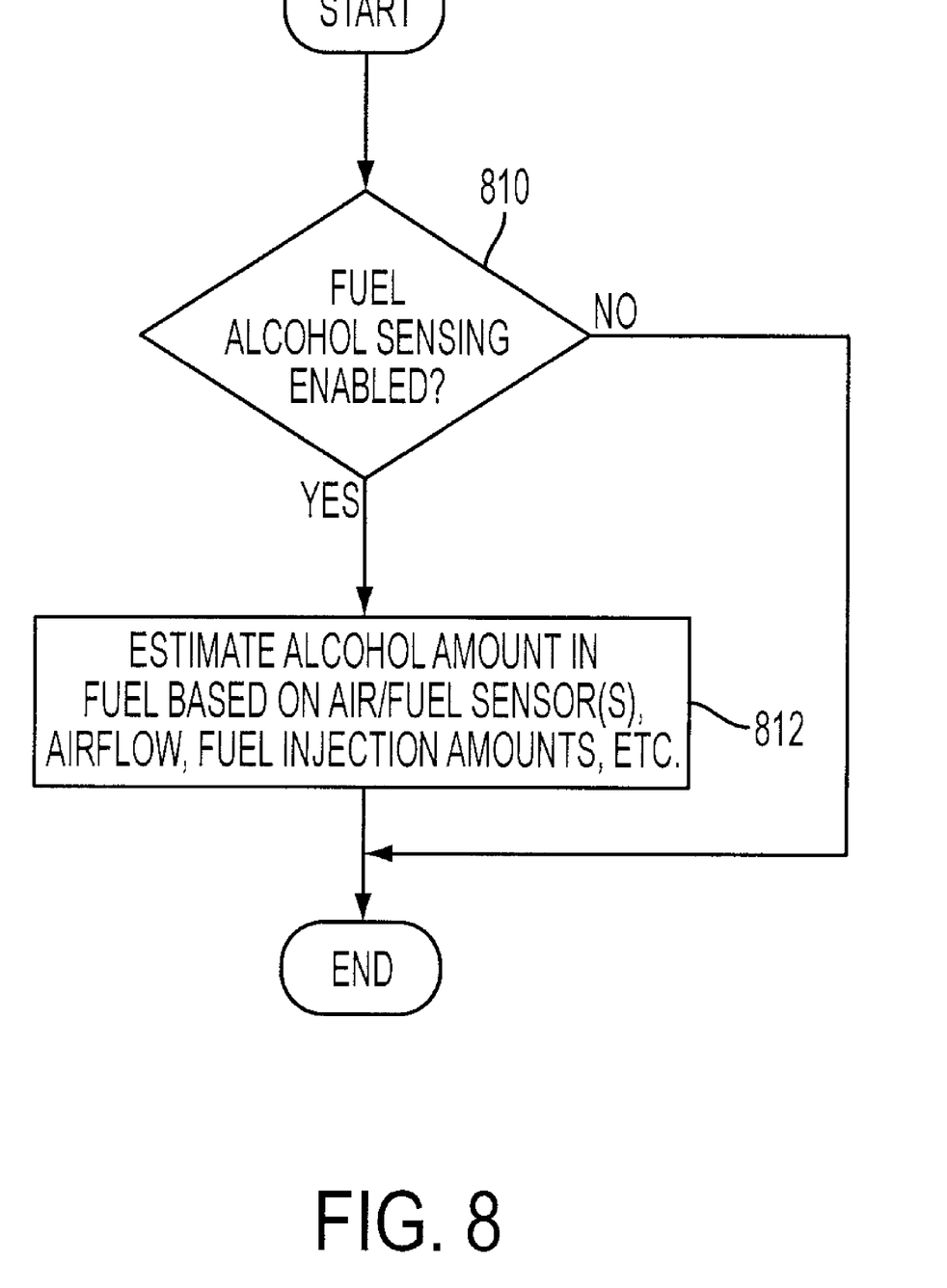

Referring now to FIG. 8, a routine is described for estimating a fuel alcohol content during engine operation. First, in 810, the routine determines whether fuel alcohol sensing is enabled. This determination can be determined on various factors, including whether the engine is operating in a warmed up state (EG not cold start), whether the engine is operating at an air/fuel ratio about stoichiometry, whether fuel vapor purging is present (e.g., when fuel vapor purging is not present), whether adaptive learning is enabled, and various others. Further, the fuel alcohol sensing can be triggered in response to a fuel tank refill event which can be determined by monitoring the fuel door position and/or fuel tank levels. For example, an increase in the fuel tank level sensed by the control system being greater than a threshold amount can indicate a refueling event. When the answer to 810 is yes, the routine continues to 812 to estimate the alcohol amount in the fuel based on air/fuel ratio sensors, airflow, fuel injection amounts and optionally other operating conditions. For example, a shift in the stoichiometric air/fuel mixture as sensed by these parameters may be used to infer a relative amount of alcohol in the fuel.

An alternative embodiment, alternate estimation routines and/or fuel quality sensors may be used. For example, an alcohol sensor may be used in the fuel tank, on the fuel rail, or in various other engine system locations.

Figure 9:
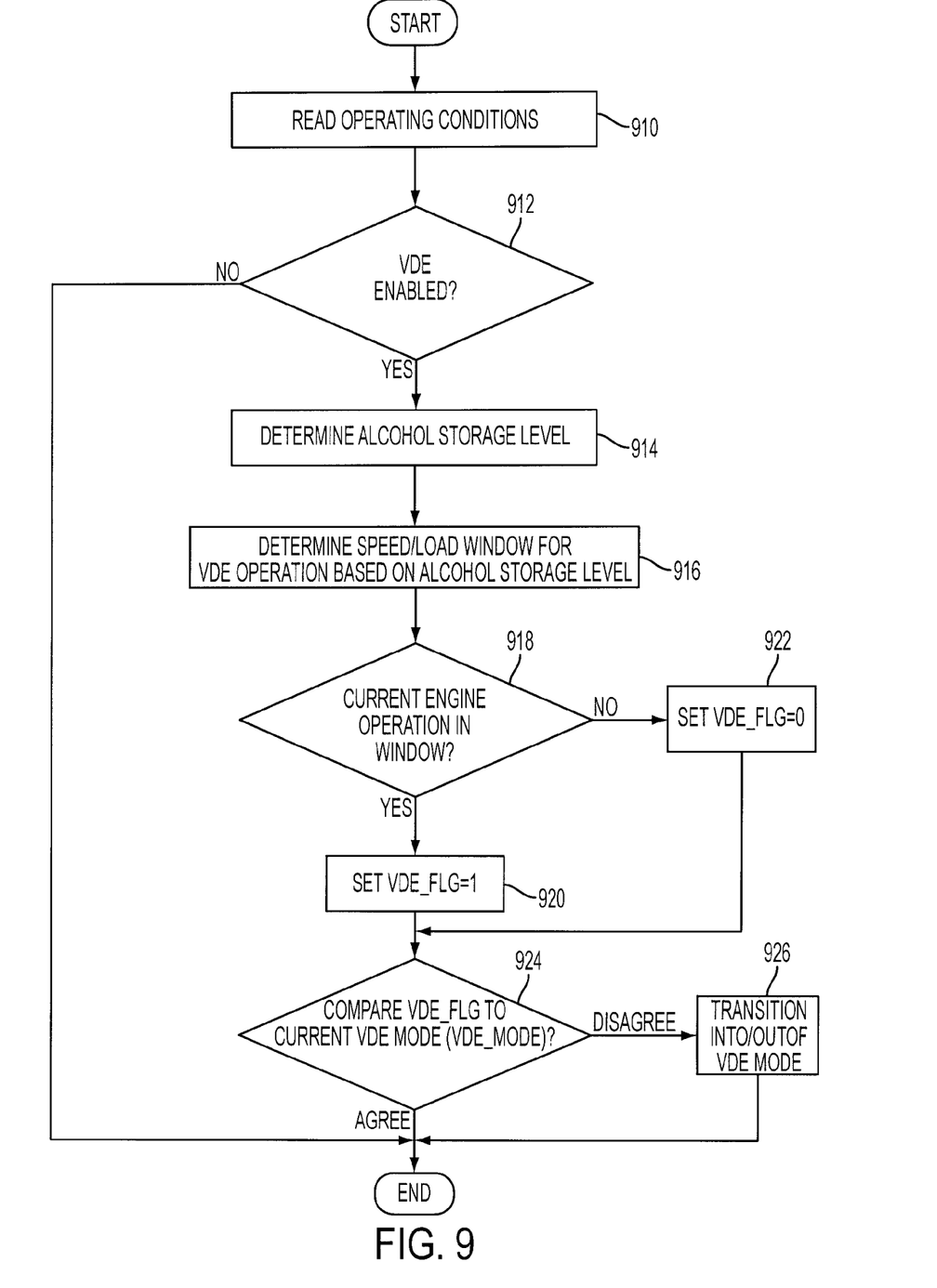

Referring now to FIG. 9, a routine is described for controlling selection of VDE operation in response to a storage level of a fuel comprising alcohol. First, in 910, the routine reads various operating condition. The operating conditions can include engine operating conditions, vehicle operating conditions, environmental conditions, and various others. Next in

912, the routine determines whether VDE operation is enabled. The determination of 912 can be based on various operating conditions, such as those reed in 610 including: the time since the engine is started, engine coolant temperature being greater than a minimum threshold, vehicle speed being greater than a minimum vehicle speed, engine speed being greater than a minimum engine speed, the absence of degraded components and/or sensors, and others. If so, the routine continues to 914 to determine the storage level of the alcohol fuel. Various approached may be used to determine fuel level, including measuring a tank level, estimating a tank fill level, etc.

Next, in 916, the routine determines a VDE operating window based on various parameters including the alcohol fuel level determined in 914. For example, as described with regard to FIG. 5, the routine may adjust the speed and/or load operating windows in which VDE operation is enabled or selected based on the fuel level, in addition to other parameters, such as the fuel alcohol content. Again, while in this example the window is generally defined by a speed load window; various other additional or alternative parameters may be used, if desired, such as engine torque, for example.

Next, in 918, the routine determines whether the current engine operation is within the determined window from 916. If so, the routine continues to 920 to set a VDE flag (VDE_flg) to 1. Otherwise, in 922, the routine sets the VDE flag to 0.

From either 920 or 922, the routine continues to 924 to compare the VDE flag to the current VDE mode (VDE_mode). In this example, the current VDE mode represents the current state of engine operation. When the flag and the mode agree, the routine ends. Otherwise, when the flag and the mode disagree, the routine continues to 926 to transition into or out of the VDE mode so that the mode parameter matches the flag set in either 920 or 922.

In this way, it is possible to adjust the engine operating conditions under which VDE operation occurs to take advantage of alcohol when present, and to avoid potential knock limits when insufficient levels of the alcohol fuel occur.

Figure 10:
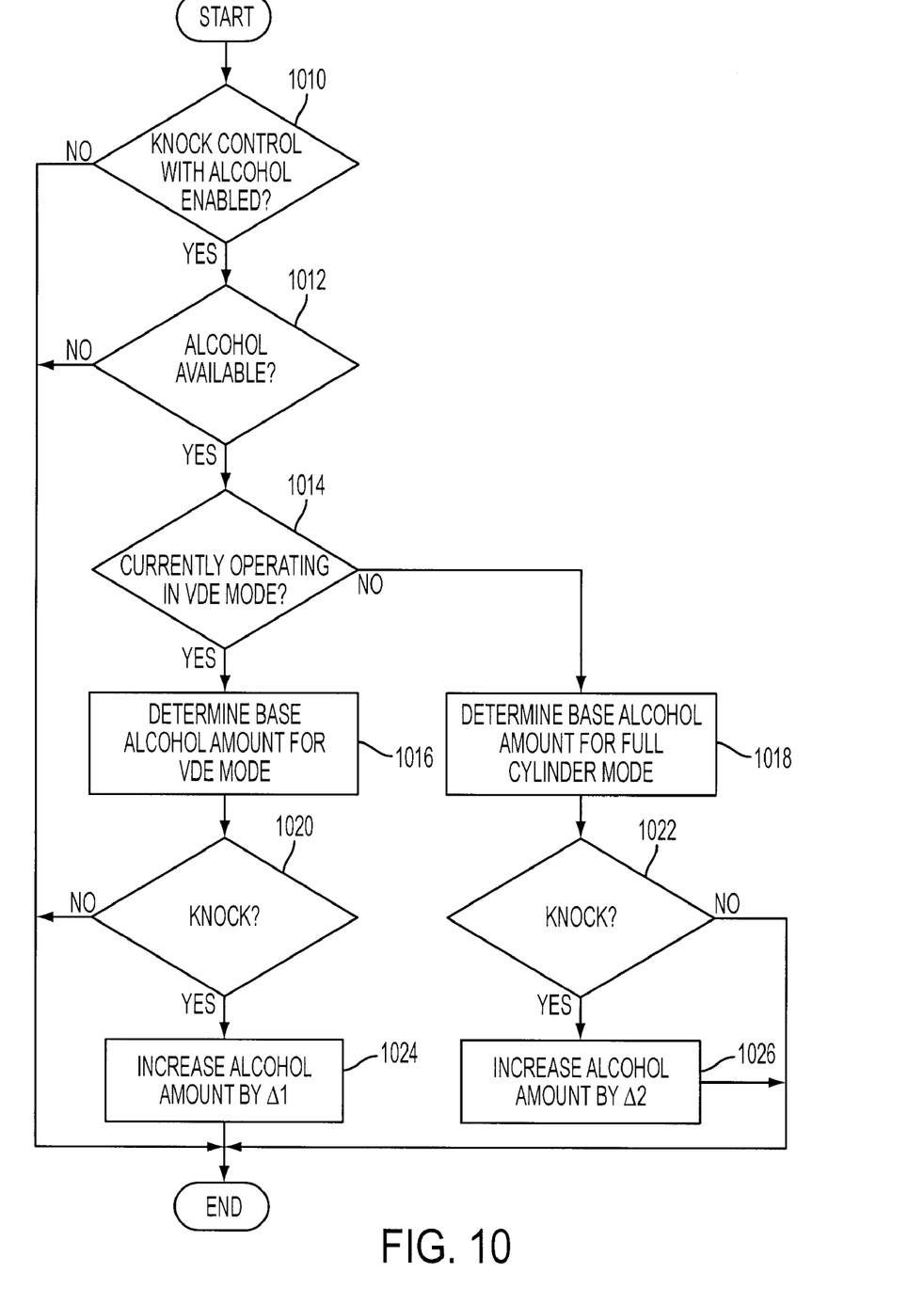

Referring now to FIG. 10, a routine is described for controlling engine operation in a VDE capable engine in which a relevant amount of alcohol to gasoline delivered to the combustion chambers of the engine may be varied during engine operation. First, in 1010, the routine determines whether not control with alcohol delivery adjustment to the engine is enabled. Such operation may be disabled under various conditions, such as during selected engine coolant temperatures, during selected ambient temperatures, during selected vehicle speeds and selected engine speeds, or various others. When the answer to 1010 is yes, the routine continues to 1012 to determine whether sufficient alcohol is available by, for example, measuring an alcohol containing fuel level, an alcohol fuel production rate, or various others. When the answer to 1012 is yes, the answer continues to 1014 to determine whether the engine is currently operating in VDE mode.

When the answer to 1014 is yes, the routine continues to 1016 to determine a base alcohol amount for VDE mode. Alternatively, when the answer to 1014 is no, the routine continues to 1018 to determine a base alcohol amount for a full cylinder operation. The base alcohol amounts can further be based on various other conditions, such as engine speed, engine load, engine coolant temperature, or various others. Also, while this example illustrates a VDE mode versus a full cylinder mode, various other partial cylinder modes may be used. From each of 1016 and 1018, the routine respectively continues to 1020 and 1022, where the routine monitors full engine knock. For example, a NOx sensor may be used to measure the occurrence of knock, or alternatively an indication of a likelihood of engine knock may be used. When no knock is detected, the routine ends from either 1020 or 1022. Alternatively, in 1020, if knock or a likelihood of knock is indicated, the routine continues to 1024 to increase the alcohol amount delivered to the engine by $\Delta 1$. Likewise, when knock is indicated in 1022, the routine continues to 1026 to increase an alcohol amount delivered to the engine by $\Delta 2$. In this way, different alcohol adjustments in different cylinder operating modes may be used to provide alcohol delivery adjustments coordinated to the engine operation conditions to obtain improved knock performance while efficiently using available alcohol. Further, in this example, a base alcohol amount with adjustments is described; however, different directly determined alcohol delivery amounts may be used for each of the different cylinder operating modes. Further, the increase in alcohol amounts delivered may further be adjusted based on various additional parameters, such as engine speed, engine mode, air charge temperature, and various others. Further, these adjustments may be adaptively learned and separately stored for the various cylinder operating modes.

Note also that various approaches may be used to adjust/increase the amount of alcohol delivered to the cylinder to vary the charge cooling effect. For example, an amount of directly injected alcohol containing fuel may be increased. In another example, a relative amount of alcohol and gasoline delivered to a cylinder may be varied. Further, in still another example, a relative ratio of a higher alcohol content fuel to a lower alcohol content fuel may be varied. Finally, still other examples may be used as noted herein. Further still, one approach adjusts the relative or percent amount of ethanol based on VDE operation using a base amount determine as a function of speed and load that is adjusted when VDE conditions are present, other approaches may also be used. For example, the adjustment of the base amount can be based on an indication of engine knock and also based on whether the VDE mode is operating.

In this way, it is possible to appropriately coordinate the abatement or reduction in engine knock during a plurality of different cylinder operating modes with varying numbers of active cylinders, while enhancing reduced cylinder operating mode operating window and effective use of on board alcohol.

Figure 11:
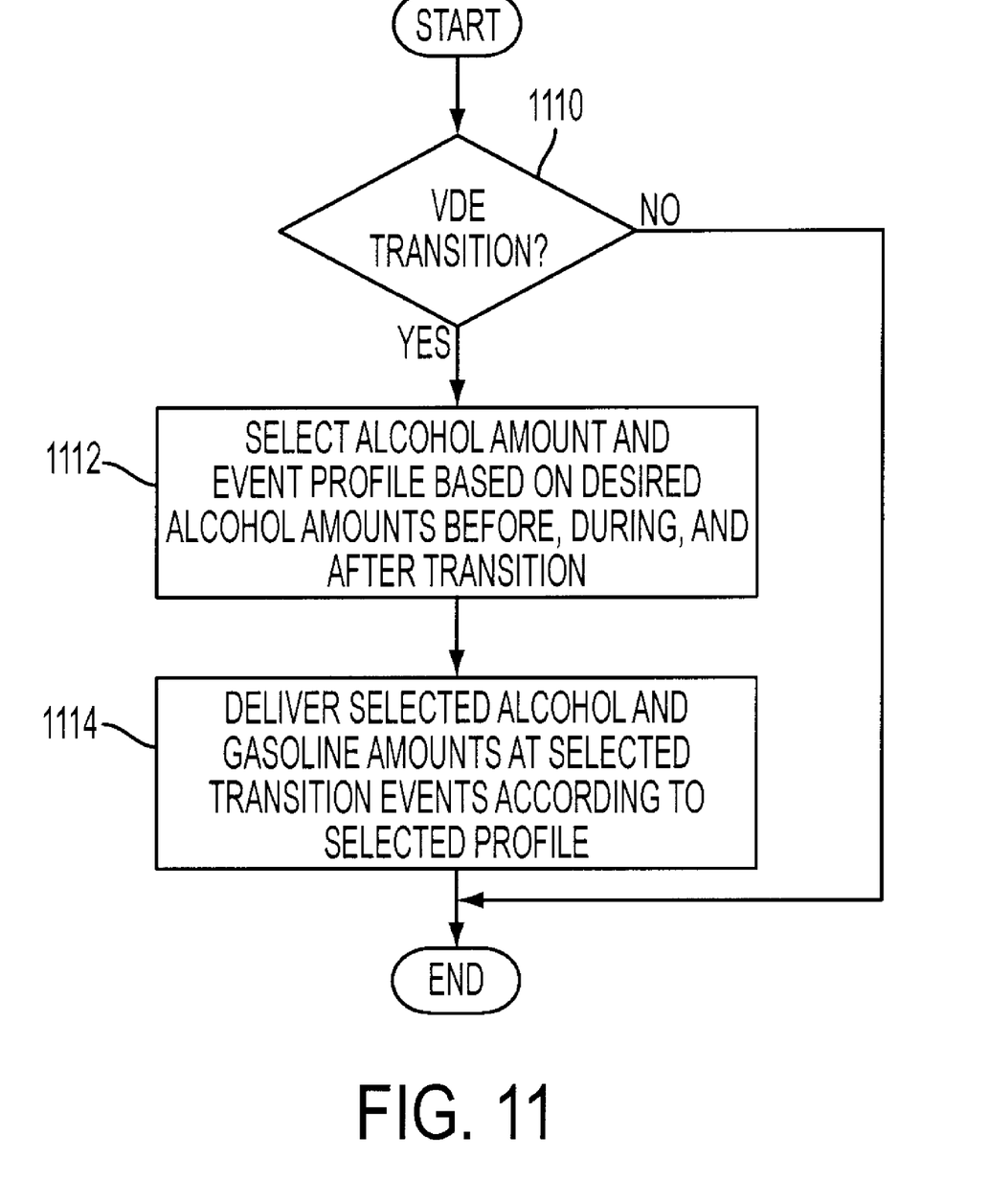

Referring now to FIG. 11, an example routine is described for controlling transitions to into and/or out of variable displacement operation. First, in 1110, the routine determines whether the transition is in progress and/or requested. If so, the routine continues to 1112 to select an alcohol amount and event profile based on the desired alcohol amount before during and after the transition. Then, in 1114, the routine delivers the selected amount and profiles.

For example, in some operating conditions a cylinder may be deactivated substantially trapping exhaust gas. For example, the trapped gas within a deactivated cylinder may be comprised substantially of combusted exhaust gas at approximately stoichiometric air/fuel ratio. As such, when the cylinder is reactivated, over the first several events the residual exhaust gas retained in the cylinders gradually reduced to the steady state amount for the given operating conditions. As such, the tendency for engine knock may be substantially reduced during first several events due to the increased amount of residuals. Therefore, the alcohol delivery and spark timing can be coordinated to vary over several events to match the varying residual profile. In this way, more effective use of on board alcohol can be achieved.

While varying exhaust gas residuals is one example of transit conditions that can effect the desired alcohol amount profile, various others may be present. Further, the alcohol amount delivered during the cylinder mode transition can be further adjusted based on knock sensor feedback, if desired. In addition, relative amounts of alcohol and/or gasoline containing fuels delivered during the transition may be further adjusted based on exhaust gas sensor feedback to maintain a substantially stoichiometric exhaust gas mixture of the cylinders before during and after the transition.

As described above, in partial cylinder deactivation conditions, a directly injected alcohol-gasoline fuel blend may be used to extend VDE operation. The directly injected alcohol blend can be used to mitigate engine knock limits, thus enabling the engine to obtain the benefits of VDE operation at high cylinder loads. In the example where the alcohol percentage is controllable (e.g., via separator, separate storage, etc.), the amount or relative amount of alcohol fuel may be adjusted (e.g., increased) under VDE operating conditions in response to an increased tendency for knock. Further, the VDE operation range (e.g., load/torque limits for enabling/disabling VDE operation) may be adjusted based on the alcohol percentage of a given fuel. Finally, the increased fuel economy available when increased alcohol is present may be advertised as an incentive to the customer/driver for using alcohol based fuels.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine or vehicle control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine having at least one cylinder that may be deactivated and a fuel system operating with an alcohol fuel blend, comprising:
adjusting a range of operating parameters in which the at least one cylinder is deactivated, where said range is adjusted as the alcohol blend of the fuel varies.

2. The method of claim 1 wherein cylinder deactivation includes deactivating all intake and exhaust valves of the at least one cylinder for a plurality of cycles.

3. The method of claim 2 wherein said range of operating parameters includes a speed and torque range.

4. The method of claim 3 wherein said range is adjusted based on a percentage of alcohol in the alcohol fuel blend, where said percentage is determined based on feedback from an exhaust gas oxygen sensor.

5. The method of claim 1 wherein said range is increased as an amount of alcohol in the fuel is increased, at least for some conditions.

6. The method of claim 5 wherein a load range is increased.

7. The method of claim 5 wherein a speed range is increased.

8. The method of claim 1 further comprising adjusting an ignition timing of an active cylinder during deactivation of said at least one cylinder in response to the alcohol fuel blend.

9. A method for operating an engine having at least one cylinder that may be deactivated and a fuel system operating with an alcohol fuel blend, comprising:
adjusting the alcohol blend of the fuel delivered to the engine during engine operation responsive to whether the at least one cylinder is deactivated.

10. The method of claim 9 where said adjusting includes:
during active operation of the at least one cylinder under a selected operating condition, providing a first alcohol fuel blend in fuel delivered to the engine; and
during deactivated operation of the at least one cylinder under the selected operating condition, providing a second alcohol fuel blend, different from the first, in fuel delivered to the engine.

11. The method of claim 10 wherein said first alcohol fuel blend has relatively less alcohol than the second alcohol fuel blend.

12. The method of claim 11 where said blend is further adjusted responsive to a level of fuel stored.

* * * * *